United States Patent
Rydgren (10) Patent No.: US 7,555,320 B2
(45) Date of Patent: Jun. 30, 2009

(54) RADIO COMMUNICATION TERMINAL WITH A DETACHABLE ACTIVE HOUSING AND RELATED CONNECTOR

(75) Inventor: Åke Rydgren, Södra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 738 days.

(21) Appl. No.: 10/521,026

(22) PCT Filed: May 31, 2003

(86) PCT No.: PCT/EP03/05715

§ 371 (c)(1),
(2), (4) Date: Jan. 12, 2005

(87) PCT Pub. No.: WO2004/008721

PCT Pub. Date: Jan. 22, 2004

(65) Prior Publication Data

US 2006/0135056 A1    Jun. 22, 2006

Related U.S. Application Data

(60) Provisional application No. 60/426,114, filed on Nov. 14, 2002.

(30) Foreign Application Priority Data

Jul. 12, 2002   (EP) .................................. 02445096
Oct. 22, 2002   (EP) .................................. 02445141

(51) Int. Cl.
*H04M 1/00* (2006.01)
(52) U.S. Cl. ............... 455/575.1; 455/550.1; 455/556.1; 455/557; 455/90.3; 455/349; 379/420.04; 379/428.01; 379/433.01; 379/433.05

(58) Field of Classification Search ............... 455/550.1, 455/74, 556.1, 556.2, 557, 575.1, 575.8, 455/90.2, 90.3, 95, 573, 348, 350, 349, 351; 379/420.01–420.04, 428.01, 428.02, 434, 379/433.01, 433.05, 429, 454, 455
See application file for complete search history.

(56) References Cited

U.S. PATENT DOCUMENTS 5,655,017 A     8/1997  Fishman ..................... 379/420
6,424,842 B1 *  7/2002  Winstead ..................... 455/557

(Continued)

FOREIGN PATENT DOCUMENTS

EP          0 518 578        12/1992

(Continued)

OTHER PUBLICATIONS

International Preliminary Examination Report for PCT/EP03/05715.

*Primary Examiner*—Sujatha Sharma
(74) *Attorney, Agent, or Firm*—Myers Bigel Sibley & Sajovec (57) ABSTRACT

A radio communication terminal includes a data processor for controlling terminal functions and an attachment for releasable attachment of a housing to the terminal. The terminal includes a multipath connector connected to the data processor. The multipath connector includes a terminal system connector, and a housing connector configured to provide a communicative connection of an attached housing to the data processor.

19 Claims, 5 Drawing Sheets

U.S. PATENT DOCUMENTS

| | | | |
|---|---|---|---|
| 6,636,750 B1 * | 10/2003 | Zurek et al. | 455/569.1 |
| 6,810,238 B1 * | 10/2004 | Deeds et al. | 455/90.1 |
| 7,092,519 B1 * | 8/2006 | Lindholm | 379/419 |
| 7,197,345 B2 * | 3/2007 | Kim et al. | 455/575.3 |
| 7,236,588 B2 * | 6/2007 | Gartrell | 379/433.01 |
| 2003/0194974 A1 * | 10/2003 | Curtis et al. | 455/90.1 |

FOREIGN PATENT DOCUMENTS

| | | |
|---|---|---|
| EP | 0 608 899 | 8/1994 |
| EP | 0 760 541 A2 | 3/1997 |
| EP | 0 760 541 A3 | 3/1997 |
| GB | 2 339 342 | 1/2000 |
| GB | 2 362 071 | 11/2001 |
| JP | 2001-102716 A | 4/2001 |
| JP | 2001-102951 A | 4/2001 |
| WO | 01/37229 | 5/2001 |
| WO | 02/41607 | 5/2002 |

* cited by examiner

FIG. 11

RADIO COMMUNICATION TERMINAL WITH A DETACHABLE ACTIVE HOUSING AND RELATED CONNECTOR

RELATED APPLICATIONS

The present application is a 35 U.S.C. §371 national phase application of PCT International Application No. PCT/EP03/005715, having an international filing date of May 31, 2003 and claiming priority to European Patent Application No. 02445096.7, filed Jul. 12, 2002, European Patent Application No. 02445141.1, filed Oct. 22, 2002 and United States Provisional Application No. 60/426,114 filed Nov. 14, 2002, the disclosures of which are incorporated herein by reference in their entireties. The above PCT International Application was published in the English language and has International Publication No. WO 04/008721.

FIELD OF THE INVENTION

The present invention relates generally to radio communication terminals having a detachable housing or cover, and to such detachable housings or covers. In particular, the invention relates to releasably attachable active housings devised to provide functional modules for a radio communication terminal.

BACKGROUND

The first commercially attractive cellular telephones or terminals were introduced in the market at the end of the 1980's. Since then, a lot of effort has been made in making smaller terminals, with much help from the miniaturisation of electronic components and the development of more efficient batteries. Today, numerous manufacturers offer pocket-sized terminals with a wide variety of capabilities and services, such as packet-oriented transmission and multiple radio band coverage.

In order to attract customers the terminal manufacturers have therefore taken further measures to strengthen their position in the competition, one such being to offer terminals with detachable covers or housings. If a user wishes to change the outer appearance of his communication terminal, he can simply buy a new cover of the desired kind. The old cover is preferably released by a simple grip without the aid of tools, where after the new cover can be snapped on. A detachable cover is generally a fairly simple element, essentially formed from a single piece of plastic or possibly metal. The cover may represent only the front side of the terminal, i.e. the side of the terminal carrying the user interface generally comprising a terminal display and keypad, a microphone and a loudspeaker. In such a design, the cover forms a separate part of the housing of the terminal, or optionally an auxiliary part to be attached outside the housing. Alternatively, the cover may include more than one piece, e.g. a front piece and a back piece devised to substantially enclose the terminal. The detachable covers are often provided in different colours, and also with more advanced patterns such as logos or images.

The detachable covers of the prior art mainly create an aesthetic effect, changing the visual appearance of the terminal. They do not, however, have any effect on the functions of the terminal. Other solutions for creating this aesthetic effect, without having to change the cover, have also been proposed.

EP 1079584 by Laurikka et al discloses a cover for an electronic device, such as a communication terminal, whose colour can be changed by means of a control signal. That cover is advantageously produced by using a material, which changes its colour as a result of the effect of an electric or electromagnetic control signal. Such a material is for example electronic ink, with which a conventional cover is coated. The appearance of cover can hence be controlled by a signal from the communication terminal. When a call or a text message arrives in the communication terminal, it indicates this to the user by changing the colour of the cover.

Also EP 564127 by Blonder shows an apparatus housing capable of changing colour. The housing has a transparent outer layer, covering a layer of electrically switchable light modulating material. This invention too suggests indicating e.g. a telephone ring by changing the housing colour.

Today there is a market need for a variety of radio communication terminals with different features in different price ranges. However, more different terminal varieties leads to increased costs in development, production, stock, distribution, and marketing. Furthermore, there is a constant or even increasing pace in development of new components, such as electronics, batteries, and displays, rendering the lifetime of a terminal model shorter and shorter before the next model is introduced. Today terminals are sold with different features and at different prices. Such features include e.g. touch-screen, speakerphone, special buttons etc. Normally, the only thing that can be changed for the user is the appearance of the housing, and the software controlling ring signals and displayed images.

SUMMARY OF THE INVENTION

A problem with portable communication terminals of today is that it is expensive to produce a wide variety of different phones in order to attract a large market Furthermore, some features or parts of the terminals develop faster than other features, which means that one outdated part might decrease the market value for the entire terminal, even if it is otherwise fully competitive. An object of the present invention is therefore to provide a solution for making portable communication terminals suit a wider range of customers, and more easily adaptable to various functions.

According to a first aspect, this object is fulfilled by a radio communication terminal comprising data processing means for controlling terminal functions, and attaching means for releasable attachment of a housing to the terminal, wherein said terminal comprises a multipath connector connected to the data processing means, said multipath connector including a terminal system connector, and a housing connector for communicative connection of an attached housing to the data processing means.

Preferably, the multipath connector is positioned such that the system connector is accessible from the outside of the terminal, and such that said housing connector faces a front or rear side of the terminal. In one embodiment said housing connector faces a different direction than the system connector.

Preferably, the multipath connector is positioned at an end of the terminal, such that the system connector is accessible in a longitudinal direction of the terminal, whereas said housing connector faces a front or rear side of the terminal. The multipath connector may comprise two housing connectors, for communicative connection of a front housing and a rear housing.

Advantageously, said multipath connector comprises connector poles that are branched to said system connector and said housing connector.

According to a second aspect, the object of the invention is fulfilled by a disconnectable housing for a radio communication terminal according to what has been outlined above, comprising attaching means for releasable attachment of the housing to the terminal. Said housing comprises a terminal connector devised to provide bus connectivity with said terminal upon attachment, and functional means connected to said terminal connector for affecting the function of an attached terminal.

Preferably, said functional means for affecting the function of an attached terminal comprises a micro controller. Furthermore, said functional means for affecting the function of an attached terminal preferably comprises a functional member, adding a feature to the terminal when the housing is attached thereto. Alternatively, said functional means for affecting the function of an attached terminal comprises a functional member, devised to modify a feature of the terminal when the housing is attached thereto.

In one embodiment said functional member comprises a touch-sensitive display.

In one embodiment said functional member comprises a speaker for hands free operation.

In one embodiment said functional member comprises a digital image recorder.

According to a third aspect, the object of the invention is fulfilled by a radio communication terminal and housing combination, wherein cooperating attaching means are devised for releasable connection of the housing to the terminal, and wherein said housing comprises means for affecting the function of the terminal, and where cooperating housing-to-terminal connector means are provided for communicative connection between the terminal and an attached housing.

Preferably, said radio communication terminal and housing combination comprises a radio communication terminal and a housing according to any of the embodiments and examples given above.

According to a fourth aspect, the object of the invention is fulfilled by a multipath connector for a radio communication terminal, which multipath connector has two separate connector interfaces comprising interconnected poles. Preferably, the multipath connector includes connection pads for connection to a terminal PCB.

In one embodiment, the multipath connector is devised to be fixed to an end of a terminal PCB, such that one connector interface faces outwardly in the longitudinal direction of said PCB, and a second connector interface faces outwardly substantially perpendicular to the PCB. In a variant of that embodiment, the multipath connector has a third connector interface facing outwardly substantially perpendicular to the PCB in the opposite direction from said second connector interface.

The detailed description shows specific features of various embodiments related to the aspects above.

BRIEF DESCRIPTION OF THE DRAWINGS

The features and advantages of the present invention will be more apparent from the following description of the preferred embodiments with reference to the accompanying drawings, on which FIG. 1 schematically illustrates a communication terminal as seen from the front, in accordance with an embodiment of the invention;

FIGS. 7A-11 illustrate various embodiments of active housings and there attachment to a terminal.

DETAILED DESCRIPTION OF PREFERRED EMBODIMENTS

The present description relates to the field of radio communication terminals. The term radio terminal or communication terminal, also denoted terminal in short in this disclosure, includes all mobile equipment devised for radio communication with a radio station, which radio station also may be mobile terminal or e.g. a stationary base station. Consequently, the term radio terminal includes mobile telephones, pagers, communicators, electronic organisers, smartphones, PDA:s (Personal Digital Assistants) and DECT terminals (Digital Enhanced Cordless Telephony). Hence, although the structure and characteristics of the antenna design according to the invention is mainly described herein, by way of example, in the implementation in a mobile phone, this is not to be interpreted as excluding the implementation of the inventive antenna design in other types of radio terminals, such as those listed above. Furthermore, it should be emphasised that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawings.

According to the invention, a terminal is provided with front and rear housings, i.e. shells or covers, that are active. By active is here meant that the housings can include electronics that together with the phone provides additional and/or modified features. For this purpose, the terminal is provided with a housing connector, connectable to a co-operating terminal connector on the releasable housing. Furthermore, means for attaching and securing the housings to the terminal are also included, devised in a co-operating manner, though not shown in all the drawings. The attaching means may be arranged in any suitable shape, several of which are well known to the skilled person and used today. The housings may e.g. be snapped on and maintained in place by a spring force, or be screwed on. The specific manner is not crucial for the present invention.

Figure 1:
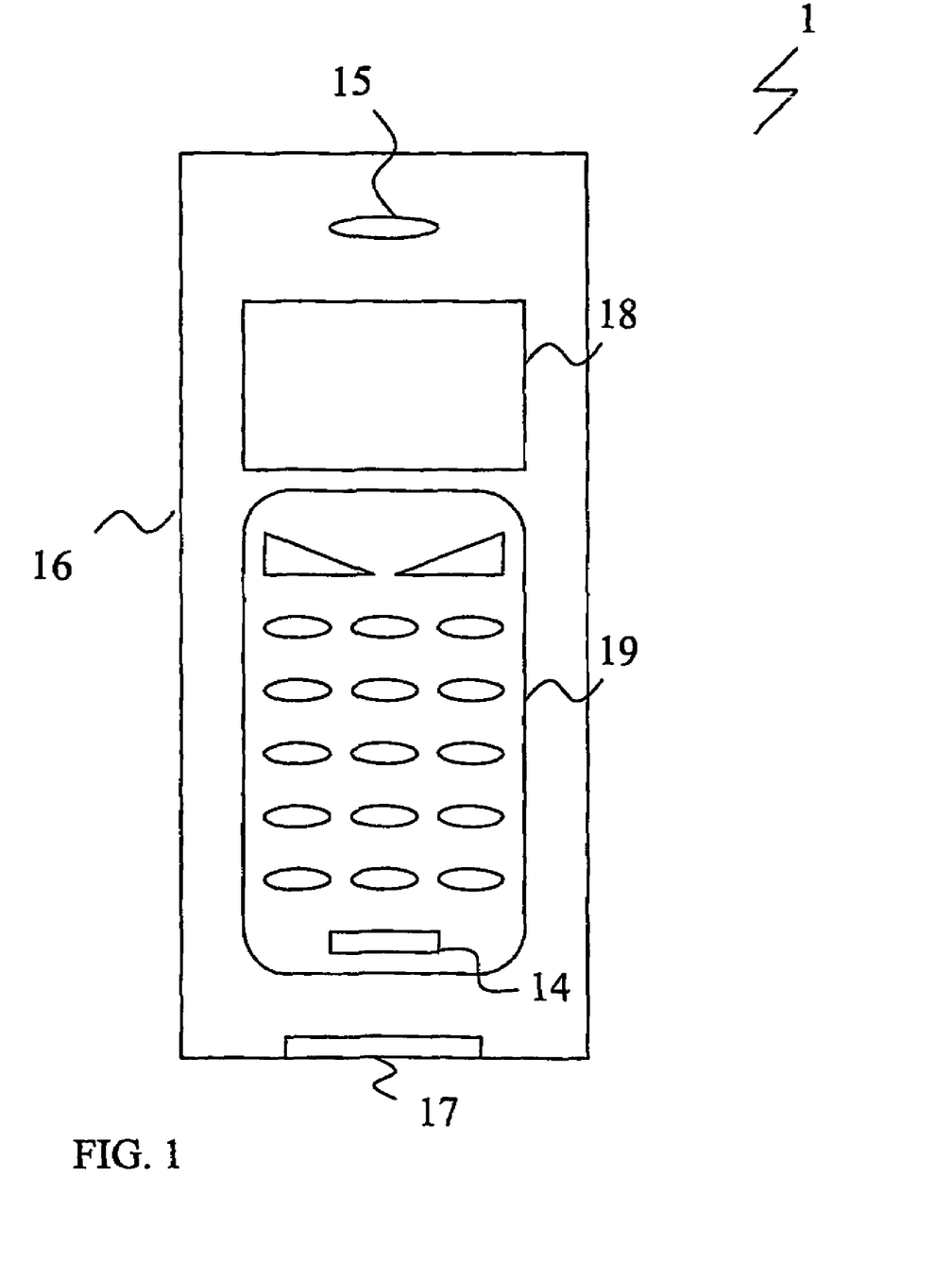

FIG. 1 illustrates a radio communication terminal 1, in the form of a cellular phone. Terminal 1 is carried in a chassis 16, directly or indirectly supporting the other components of the terminal. Terminal 1 is devised with a user-input interface, in the displayed embodiment comprising a microphone 14 and a keypad 19. The user input interface may also or comprise a touch-sensitive display in addition to or instead of the keypad 19. Furthermore, a user output interface of the terminal 1 comprises a loudspeaker 15 and a display 18. All of these features are well known in the prior art. Though not shown in FIG. 1, the communication terminal 1 further includes an antenna, radio transmission and reception electronics, and a power supply in the form of a battery. Communication terminal 1 is also devised with a computer system, including a microprocessor with associated memory and software. In order to co-operate and communicate with a releasable active housing, the terminal 1 is further devised with a connector 17.

Figure 2:
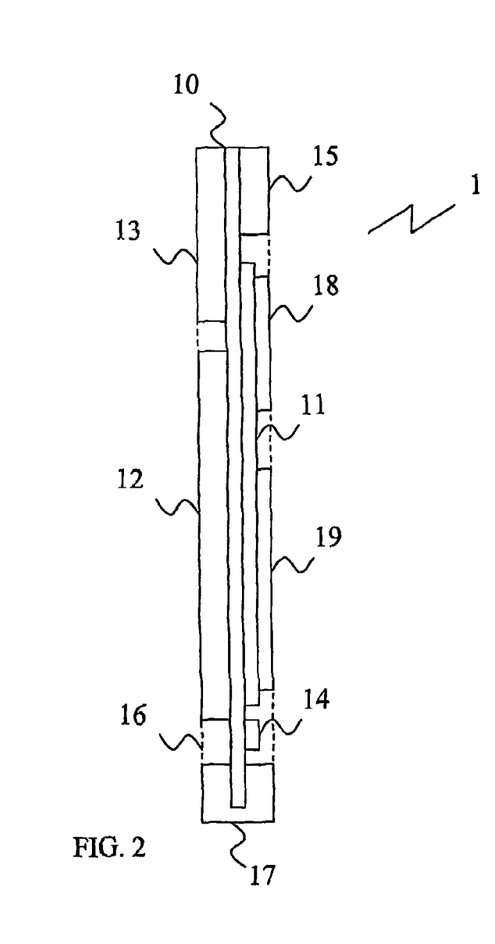
FIG. 2 illustrates the terminal of FIG. 1 in a sectional side view.

FIG. 2 illustrates the terminal 1 in a sectional view from its left side, as seen in FIG. 1. In this drawing, the different operative parts of the terminal are schematically shown, including those shown in FIG. 1. The chassis 16 is indicated by the dashed line, and its specific shape is not relevant. A printed circuit board PCB 10 carries the electronics 11 of the terminal, preferably including data processing means such as a micro processor system, or the like, with associated memory. An antenna 13 is further included, the particular type of which is irrelevant to the invention. Typical antenna types include micro strip antennas, Planar Inverted-F Antennas PIFA, and stub antennas. A battery 12 is included to feed the electronics with electrical energy.

Figure 3:
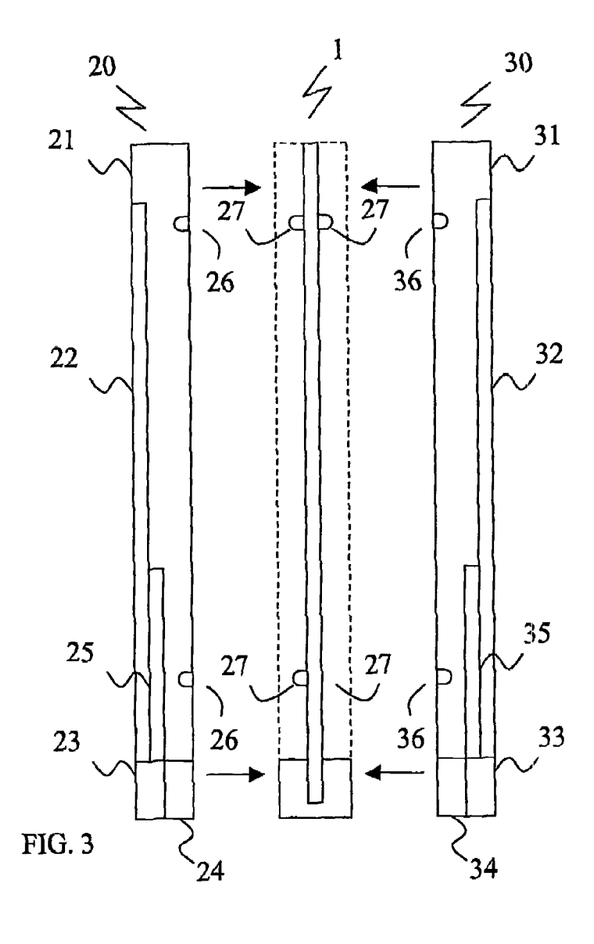
FIG. 3 schematically shows the terminal of FIG. 2 and two active housings that are connectable to the terminal.

FIG. 3 illustrates the terminal 1 and two releasable housings, a back housing 20 and a front housing 30. The arrows in FIG. 3 indicate that housings 20 and 30 are attachable to terminal 1. The illustration of the terminal 1 in FIG. 3 further includes attaching means 27 in the purely exemplary shape of recesses formed in the sides of the terminal. Furthermore, the active housings 20, 30 are provided with protruding members 26 and 36, respectively, devised to latch into engagement with the corresponding recesses 27 in the terminal 1. It should be noted that the present invention is not restricted to having both an active housing attached to the rear and the front of terminal 1. On the contrary, these two active housings 20, 30 are preferably, but need not be, independent of each other, separately communicating with the terminal 1. Therefore, only one of the housings 20, 30 may be attached, the drawing indicating both simply to show this possibility too. The specific character of the active housings 20, 30 is not shown in FIG. 2, but different examples are given below and in the subsequent drawings. Each housing 20, 30 has a shell part 21, 31, forming part of the exterior housing of the assembled terminal 1 when attached thereto. The shell part also carries, directly or indirectly, the other members of the respective active housing. Each active housing 20, 30 further includes a terminal connector 24, 34. Preferably, the terminal connectors 24, 34 and the cooperating housing connector on the terminal offer a full system bus connectivity. Each active housings 20, 30 also comprises a micro controller 25, 35 communicatively connected to the housing connector 24, 34. A functional member 22, 32, adding to or modifying the features of the terminal 1 may also be included, connected to and controlled by the micro controller 25, 35. The micro controller 25, 35 preferably has a dedicated software stored therein, for the purpose of controlling the interaction with the terminal. The active housing may have its own power supply in the form of a small battery or capacitor, but preferably makes use of the terminal battery 12 through the terminal connector 24, 34. In one embodiment, yet another releasable cover may be attached onto a first attached cover, thereby providing a further function to the terminal. For this purpose the covers 20, 30 may also include cover connectors 23, 33.

Figure 4:
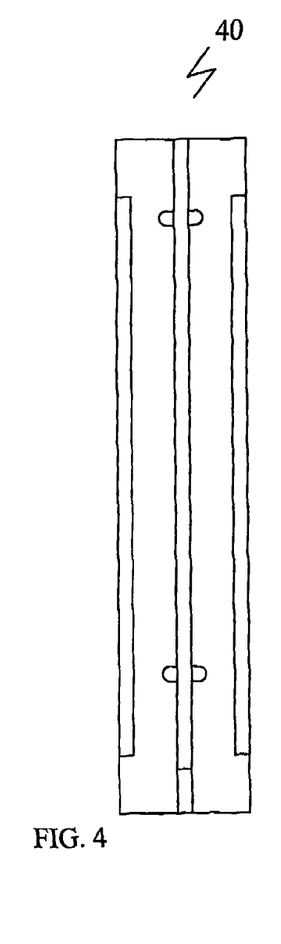
FIG. 4 illustrates a terminal when assembled with the two active housings of FIG. 3.

FIG. 4 illustrates the assembled terminal 40, comprising terminal 1 and the attached housings 20, 30, but without the separate parts of the terminal 1 and the active housings 20, 30 indicated. As before, the assembled terminal may also comprise the terminal 1 and only one active housing 20 or 30. Furthermore, there may be more than two active housings, attached beside or over each other. When the active housings 20, 30 are connected to the terminal 1 they may fully enclose the terminal 1, but they may also occupy only parts of the exterior of the terminal 1.

Figure 5:
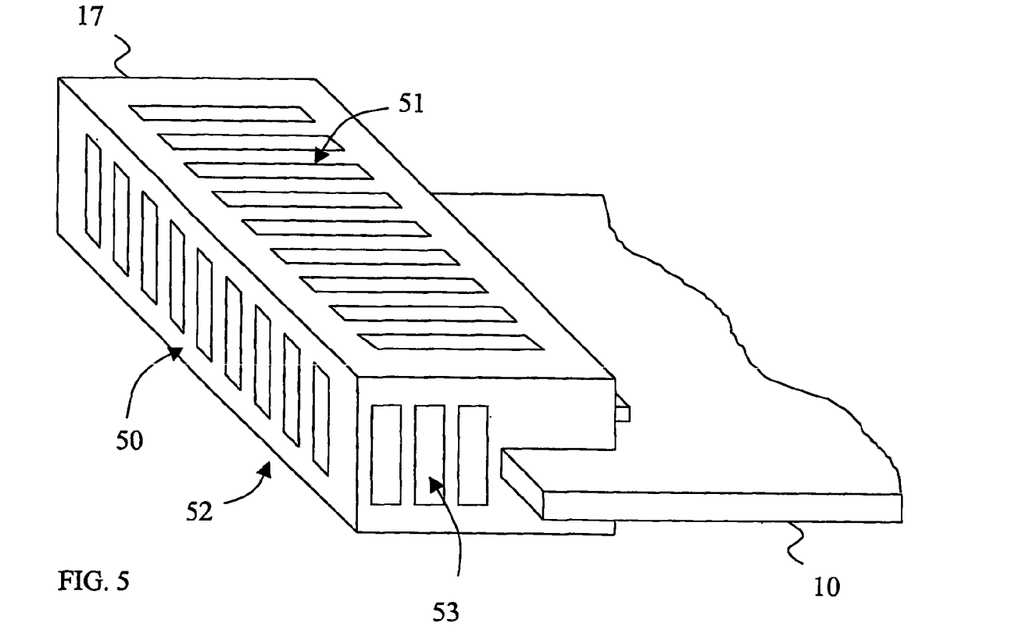
FIG. 5 schematically illustrates a terminal connector including both the terminal system connector and housing connectors.

FIG. 5 illustrates the connector 17 and a cut-off portion of the PCB 10 to which it is connected. The connector 17 comprises a number of connecting elements or poles preferably made from a suitable metal, such as copper, carried in an insulating support structure of e.g. plastic. In a preferred embodiment, connector 17 includes, on one side, the system connector of the terminal 1. In FIG. 5 the system connector 50 is arranged on the bottom side of the terminal 1, which is a common approach in radio communication terminals of today. The system connector 50 is accessible from the outside of the terminal 1, and comprises a set of poles that for instance are usable for connecting the terminal to a battery charger without having to dismantle the battery 12 from the terminal 1. Furthermore, the system connector 50 includes poles for data communication with the terminal 1, which e.g. can be used for attaching auxiliary components to the terminal 1, such as audio or video players or recorders, extra keypads, and so on. The poles indicated in the drawing are merely exemplary, and the invention is in no way restricted to the shown shape and layout of the poles.

The connector 17 also includes one or more housing connectors 51, 52 and 53, for connecting to active housings, each comprising a set of one or several electric poles. Consequently, the connector 17 is a is a multipath connector. Preferably, the housing connector 52 is identical to the opposite housing connector 51. According to the displayed embodiment of FIG. 5, the connector 17 consequently carries both the system connector 50 and the housing connectors 51, 52, 53. The sideways facing connector 53 need not be included.

Figure 6:
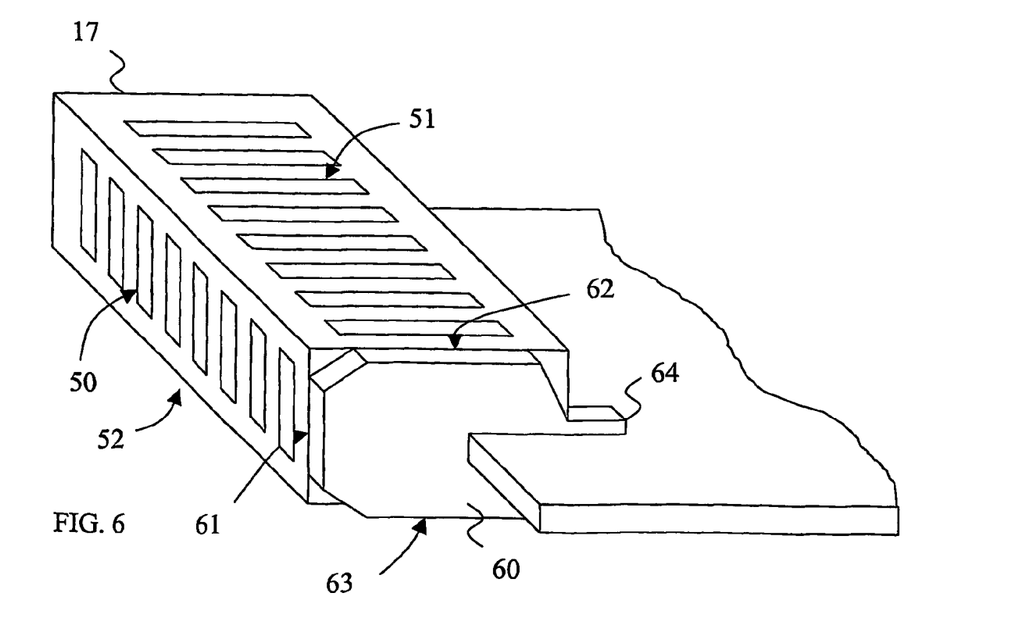
FIG. 6 further illustrates a version of the connector of FIG. 5, wherein the system connector is branched to provide connection also to active housings.

FIG. 6 further illustrates a more specific version of the embodiment of FIG. 5. Herein, a piece of the connector 17 is cut out, such. that one connector pole 60 is laid open. From FIG. 6 it is evident that this embodiment includes poles 60, which are included in both the system connector 50 and in one or more housing connectors 51, 52. The pole 60 includes a conductive member with contact parts 61, 62, 63 which are accessible from different sides. The connector pole 60 is connected to the PCB 10, e.g. by a solder pad 64.

Consequently, the system connector 50 as it is hitherto known is modified such that it comprises connector faces also to the releasable active housings. Therefore, the active housings make use of the same electrical interface as is defined by the system connector 50. The housing connectors 51, 52 may have one or more poles in common with the system connector, but preferably all, although all of them need not be used by the attached active housing.

It should be noted that the system connector 50 need not necessarily face outwardly in the longitudinal direction of the terminal, as is illustrated in FIGS. 5 and 6. Instead, it may face outwardly from e.g. the rear of the terminal, i.e. being substantially parallel to the rear housing connector 52. The active housings could in such an embodiment merely be devised not to cover the system connector 50.

FIGS. 7A to 11 illustrate in a schematic manner some different embodiments of active housings to a terminal 1. These rather simple drawings indicate the co-operating housing and terminal connectors, and the member providing the optional feature, included in the active housing.

Figure 7A:
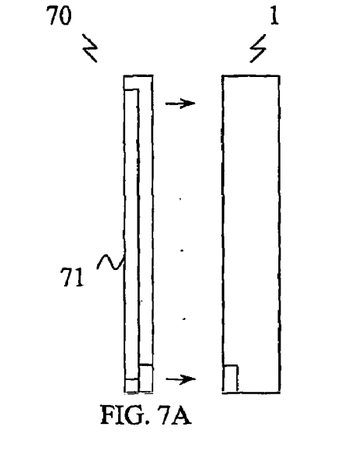
Figure 7B:
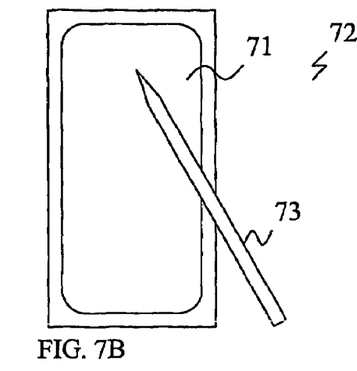

FIG. 7A illustrates a side view of a front housing 70 carrying a large touch-sensitive display 71, which housing 70 is connectable to terminal 1. FIG. 7B illustrates the assembled terminal 72 from the front, clearly showing the display 71. A stylus 72 can be used to input data to the terminal 1, 72 through the display 71.

Figure 8A:
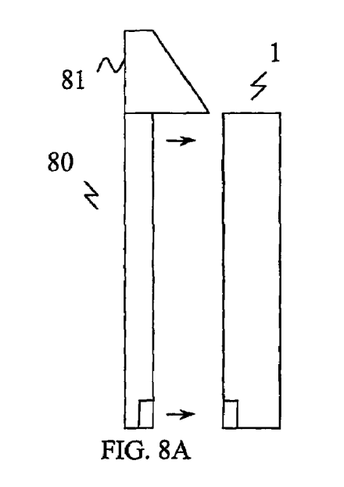
Figure 8B:
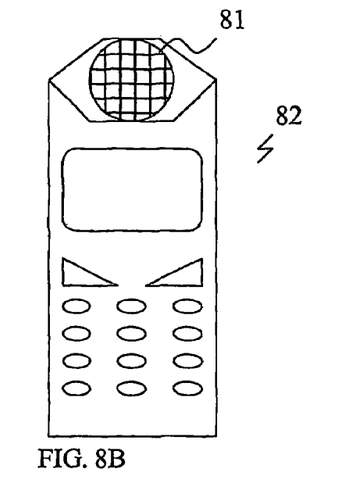

FIG. 8A illustrates a side view of a front housing 80 carrying an enlarged speaker 81 for hands free functionality, which housing 80 is connectable to terminal 1. FIG. 8B illustrates the assembled terminal 82 from the front, showing the hands free speaker 81. In the displayed embodiment the speaker 81 adds to the length of the terminal. Optionally, the speaker may be arranged to be positioned such that it instead adds to the height, i.e. thickness of the terminal. A different speakerphone arrangement is illustrated in FIG. 11, described below.

Figure 9A:
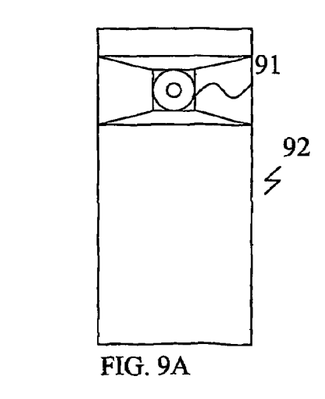
Figure 9B:
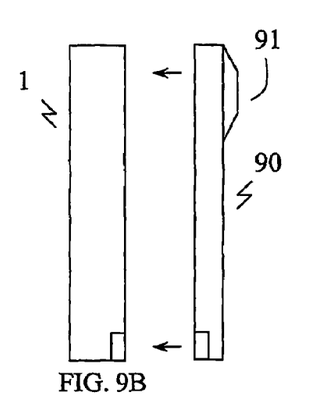
Figure 9C:
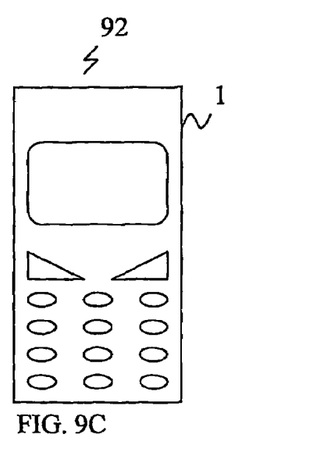

FIG. 9B illustrates a side view of a rear housing 90 carrying a digital image recorder 91, which housing 90 is connectable to terminal 1. FIG. 9A illustrates the assembled terminal 92 from the rear, indicating a lens of the digital image recorder 91. FIG. 9C illustrates the assembled terminal 92 from the front, where only the terminal 1 itself is visible since no front active housing has been attached. The digital image recorder may be a snapshot camera and/or a video recorder.

Figure 10A:
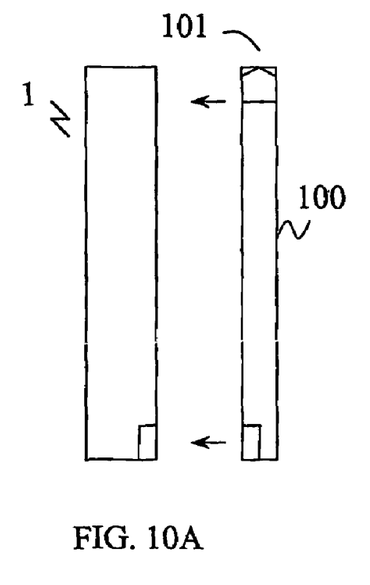
Figure 10B:
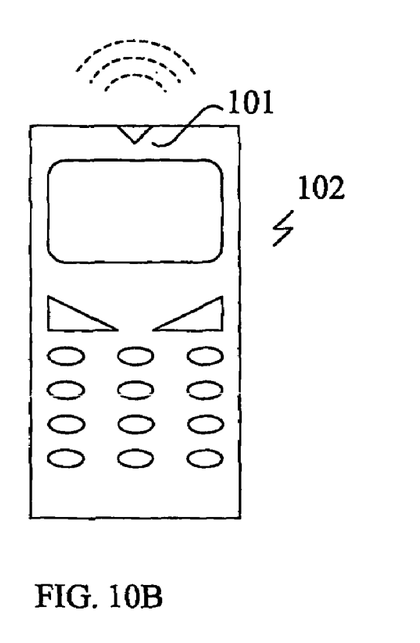

FIG. 10A illustrates a side view of a rear housing 100, carrying an auxiliary remote control 101, which housing 100 is connectable to terminal 1. FIG. 10B illustrates the assembled terminal 102 from the front, showing the face of terminal 1. The remote control sender, and possibly receiver, 101 is also indicated even though it may not be visible from the front. Such a remote control 101 may e.g. comprise an infrared transmitter, or a bluetooth chip.

Figure 11:
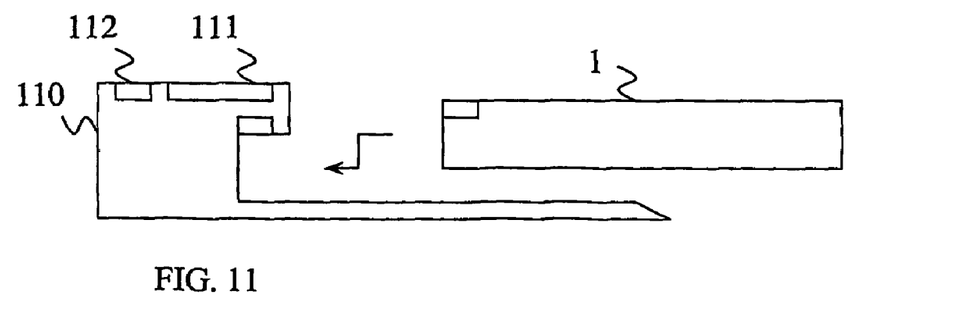

FIG. 11 illustrates a rather different embodiment of a releasable active housing 110, although it relates to the embodiment of FIGS. 8A and 8B. First of all, this drawing illustrates another way of attaching the terminal 1 to the housing 110, more or less by sliding the terminal 1 into the housing 110 as indicated by the arrow. The active housing 110 is in this embodiment devised to provide conference telephone capabilities to a portable terminal 1. The active housing 110 may be devised to rest on a desktop or the like, and has a bottom rest surface for this purpose, facing downwards in the drawing. In alternative embodiments the active housing may of course be devised with the rest surface such that the terminal is maintained in a different position, such as straight up or at a tilted angle. The active housing 10 of FIG. 11 is shaped to receive the terminal 1 in a horizontal arrangement, as indicated in the drawing, where a side view of the terminal 1 is given. The active housing 110 has an enlarged speaker 111, or at least a more powerful speaker 111 than the ordinary terminal speaker, and the speaker 111 is therefore selected to be suitable for conveying sound to a wider audience than just one user holding the terminal to the ear. Preferably, the terminal 1 is placed in the active housing 110 with the front of the terminal 1 facing upwards, such that the terminal display and keypad can be conveniently used. The conference telephone active housing 110 may also be devised with suitable conference phone controls 112. Such controls include volume control and a secrecy function, such that the terminal is set to a listen only mode. The conference phone controls 112 preferably comprise buttons, the triggering of which is relayed to the terminal through the co-operating connectors of the housing 110 and the terminal 1.

The embodiments described above in conjunction with the drawings represent examples of how active housings according to the invention may be devised. However, many other examples are possible, a few of which are outlined here without reference to any specific drawing.

A front housing could be include a user input interface adapted to suit a certain category of users, such as children or elderly people. Such an active housing can have only a few large buttons with custom images and/or text, like "Nurse", "Daughter", "Taxi", "Mum", "Dad", "Home", "Work" etc. Preferably the logic contained in the software for the housing micro controller is also devised to set up the terminal 1 in a special way upon attachment. For instance, the housing software may be triggered by the attachment of the active housing to the terminal to reject all incoming messages, only allow incoming calls from certain numbers, and so on.

In one embodiment the active housing may be adapted for playing games on the terminal, having dedicated gaming buttons and an analog joystick.

An active housing may also include particular alarm functions for indicating incoming calls or messages, by illuminating the shell of the cover.

Some terminals include a calculator function. However, it is generally quite simple, and in one embodiment an active housing may include a more advanced calculator with buttons for more complex operations, such as logarithmic calculation and integration.

One embodiment of an active housing includes a Memory Stick reader, and can thus provide an increased memory for the terminal.

The active housing may be a media player, such as an FM radio, or a digital music player capable of retrieving audio either from a carrier or from a software memory. Today such digitally stored audio systems include the Mini Disc system and the MP3 format, but the future will of course provide other alternatives.

In one embodiment the active housing is adapted to interact with a further component. For instance, an active housing may be devised to interact with a cordless headset through a suitable channel, such as by IR or radio, e.g. bluetooth. This way the terminal can easily be adapted to be able to cooperate with such a cordless headset even though that feature was not included when the terminal was purchased. The headset could even be packaged and sold together with the active housing. Such an active housing may also include a holder for the headset, and or a charger for the headset, such that the headset may be charged by either a special battery or capacitor in the active housing, or by the battery of the terminal.

The principles of the present invention have been described in the foregoing by examples of embodiments or modes of operations. However, the invention should not be construed as being limited to the particular embodiments discussed above. A skilled person would realise that the accommodation of an active housing with full system bus connectivity to the terminal having a multipath connector gives rise to many fierier advantages or possibilities than those listed in the instant specification. Thus, the above described embodiment should be regarded as illustrative rather than restrictive, and it should be appreciated that variations may be made in those embodiments by persons skilled in the art, without departing from the scope of the present invention as defined by the appended claims.

The invention claimed is:

1. A radio communication terminal assembly comprising a radio communication terminal having a printed circuit board carrying data processing means for controlling terminal functions, a terminal system connector accessible from the outside of the terminal for attaching auxiliary components to the terminal, attaching means for releasable attachment of a housing to the terminal, and a housing connector configured to provide a communicative connection of an attached housing to the data processing means, wherein the terminal comprises a multipath connector connected to the printed circuit board and to the data processing means, wherein the terminal system connector forms a first connector interface to the multipath connector, and the housing connector forms a second connector interface to the multipath connector.

2. The radio communication terminal assembly as recited in claim 1, wherein the housing connector faces a front or rear side of the terminal.

3. The radio communication terminal assembly as recited in claim 1, wherein the housing connector faces a different direction than the system connector.

4. The radio communication terminal assembly as recited in claim 1, wherein the multipath connector is positioned at an end of the terminal, such that the system connector is accessible in a longitudinal direction of the terminal, and the housing connector faces a front or rear side of the terminal.

5. The radio communication terminal assembly as recited in claim 1 wherein the multipath connector comprises two housing connectors configured to provide a communicative connection of a front housing and a rear housing.

6. The radio communication terminal assembly as recited in claim 1, wherein the multipath connector comprises connector poles that are branched to the system connector and the housing connector.

7. The radio communication terminal assembly as recited in claim 1, further comprising a housing comprising attaching means for releasable attachment of the housing to the terminal and a terminal connector configured to provide bus connectivity with the terminal upon attachment, and functional means connected to the terminal connector for affecting the function of the attached terminal.

8. The radio communication terminal assembly as recited in claim 7, wherein the functional means for affecting the function of an attached terminal comprises a micro controller.

9. The radio communication terminal assembly as recited in claim 7, wherein the functional means for affecting the function of an attached terminal comprises a functional member configured to add a feature to the terminal when the housing is attached thereto.

10. The radio communication terminal assembly as recited in claim 7, wherein the functional means for affecting the function of an attached terminal comprises a functional member configured to modify a feature of the terminal when the housing is attached thereto.

11. The radio communication terminal assembly as recited in claim 9, wherein the functional member comprises a touch-sensitive display.

12. The radio communication terminal assembly as recited in claim 9, wherein the functional member comprises a speaker for hands free operation.

13. The radio communication terminal assembly as recited in claim 9, wherein the functional member comprises a digital image recorder.

14. The radio communication terminal assembly as recited in claim 1, wherein the first and second connector interfaces comprises interconnected poles.

15. The radio communication terminal as recited in claim 14, wherein the data processing means comprises a terminal PCB and the multipath connector comprises connection pads for connection to the terminal PCB.

16. The radio communication terminal assembly as recited in claim 15, wherein the multipath connector is configured to be fixed to an end of the terminal PCB, such that the first connector interface faces outwardly in the longitudinal direction of the PCB, and the second connector interface faces outwardly substantially perpendicular to the PCB.

17. The radio communication terminal assembly as recited in claim 16, further comprising a third connector interface facing outwardly substantially perpendicular to the PCB in a direction that is opposite from the second connector interface.

18. The radio communication terminal assembly as recited in claim 1, further comprising a detachable active housing configured to releaseably attach to the attachment means of the terminal and to enclose at least part of the data processing means.

19. The radio communication terminal assembly as recited in claim 1, wherein the multipath connector includes the terminal system connector and the housing connector.

* * * * *